United States Patent [19]
Wianecki

[11] Patent Number: 5,430,972
[45] Date of Patent: Jul. 11, 1995

[54] PLANT GROWING APPARATUS

[76] Inventor: Richard A. Wianecki, 405 Tracey Ct., Westmont, Ill. 60559

[21] Appl. No.: 83,096

[22] Filed: Jun. 25, 1993

[51] Int. Cl.6 .............................................. A01G 9/02
[52] U.S. Cl. .......................................... 47/66; 47/71; 47/79
[58] Field of Search ..................... 47/71, 66 C, 79 V

[56] References Cited

U.S. PATENT DOCUMENTS

| | | |
|---|---|---|
| D. 323,794 | 2/1992 | Wianecki . |
| 1,215,986 | 2/1917 | Pohlman ........................ 47/66 C |
| 1,600,055 | 9/1926 | Meyer ............................ 47/71 |
| 3,079,037 | 2/1963 | Schechter ...................... 47/71 |
| 4,148,155 | 4/1979 | Allen ............................. 47/79 V |
| 4,315,382 | 2/1982 | Kay et al. ..................... 47/71 |
| 4,962,613 | 10/1990 | Nalbandian .................. 47/71 |

FOREIGN PATENT DOCUMENTS

| | | | |
|---|---|---|---|
| 2469870 | 6/1981 | France ............................ | 47/79 V |
| 75741 | 10/1949 | Norway ......................... | 47/66 C |

Primary Examiner—Thuy M. Bui
Assistant Examiner—Joanne C. Downs
Attorney, Agent, or Firm—Fitch, Even, Tabin & Flannery

[57] ABSTRACT

An indoor plant growing apparatus includes a hood disposed above an open-top plant receptacle for plants and a soilless medium. The hood contains optional lighting to provide illumination for a growing plant. A water reservoir is disposed below the plant receptacle and a wick is provided near the base of the container to draw liquid such as water and nutrients to plant materials with the receptacle. A dispensing bottle provides a metered discharge of fluid into the reservoir, thus extending the maintenance intervals required. The receptacle is releasably joined to the base to allow cleaning of the plant and/or soilless medium.

11 Claims, 3 Drawing Sheets

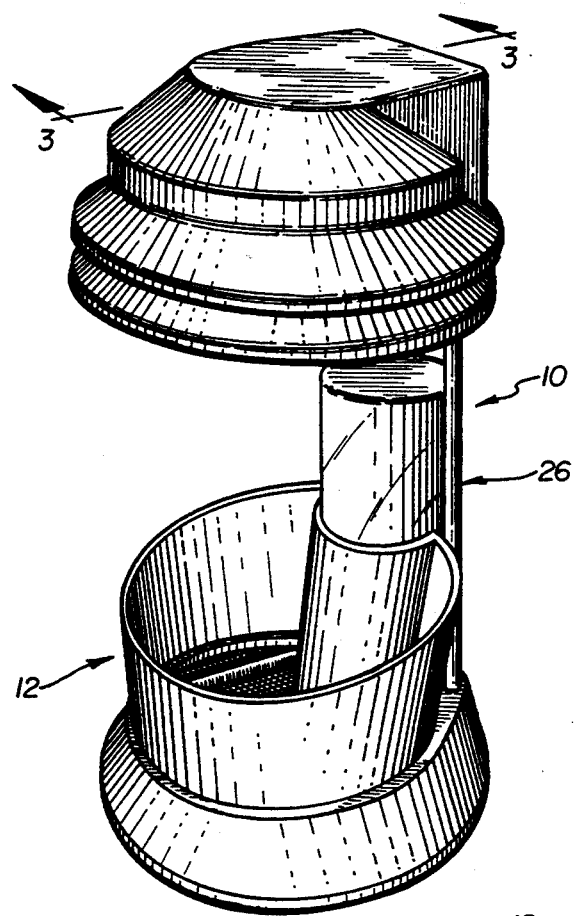
FIG. 1
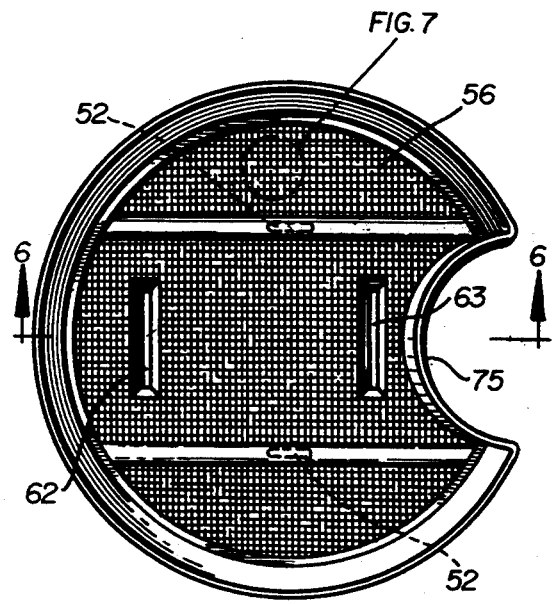
FIG. 5
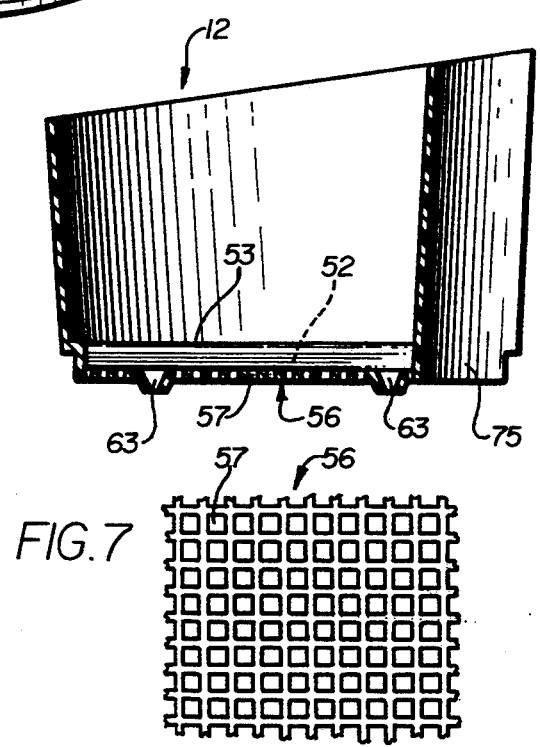
FIG. 6
FIG. 7

PLANT GROWING APPARATUS

BACKGROUND OF THE INVENTION

The present invention pertains to a plant growing apparatus for use in a home, office or the like, and in particular, to such apparatus adapted for the indoor cultivation of horticulture, such as flower plants using artificial light. More particularly, the present invention is directed to a self-contained growing system that is preferably soilless and provides automatic watering and feeding.

Indoor landscaping with potted plants is becoming increasingly popular, and different apparatus has been proposed for this purpose. For example, U.S. Pat. No. 3,939,338 shows a terrarium illuminated by an overhead lamp which is attached to the device. This arrangement offers advantages over indoor greenhouses or covered flower pots such as those described U.S. Pat. Nos. 4,651,219 or 4,219,494, in that the planter of U.S. Pat. No. 3,939,338 can be located in a dark room or dark corner of a room without harmful effects due to light deprivation.

It is important for plant vigor and growth, that the plant be regularly fed and watered. U.S. Pat. Nos. 4,245,434; 4,347,687; and 4,557,071 provide water systems external to flower pots and plant boxes to provide regular watering for the plants being serviced. In addition, U.S. Pat. No. 4,557,071 uses a wick for drawing water to the roots of a plant. U.S. Pat. Nos. 4,782,627; 3,683,548; 4,299,054; 4,324,070; 2,300,776; and 4,369,598 also use wicks or wicking means for plant watering. In addition, a number of self-watering systems of various types are disclosed in U.S. Pat. Nos. 4,285,164; 4,305,226; 4,042,150; 4,052,818; 1,231,976; and 4,117,805.

Despite the advances indicated above, improvements are needed to enable a planter apparatus to be marketed in large volume for a mass market. It is important for maximum market penetration, that the planter apparatus be reasonably priced as well as easy to use and reliable. Also, it is desirable that the apparatus be self-watering and self-feeding, and that at least a minimum amount of light be automatically, or at least easily available. In addition, the apparatus should be inexpensive to manufacture and to maintain. It has been found that manufacturing with thermoform sheets of plastic may result in higher costs and limitations in design and in the way the planter apparatus may be assembled. When thermoforming plastic sheets, the flat sheets have a predetermined thickness, for example, 0.187 inch thickness; and this is the maximum wall thickness in each part. Among other things, the present invention is directed to lowering costs by injection molding various components with thinner walls, shapes that cannot be thermoformed, and thicker, plastic portions such as bosses, and molded snap fit elements for easy and low cost assembly of the components. Moreover the lighting source used in conjunction with the planter should be positioned and secured in the plastic injection molded components for maximum effectiveness and should be of a type that is efficient to operate.

It is desirable that the planting apparatus be assembled from a minimum number of inexpensive parts which are easily assembled by a user. When erected by a user, the apparatus should be stable, especially with respect to any overhead lighting fixture, and ideally should not require special tools or skills for assembly or maintenance.

If a self-contained planter apparatus is to provide both light and self-watering, it is particularly important that electrical safety be maintained at all times, and that no special expertise be required, particularly during assembly, to assure that electrical safety of the apparatus is not compromised.

Also, it is important in many applications that the planter be as compact as possible, and that it occupy as little space on a desk or table as is possible.

SUMMARY OF THE INVENTION

The present invention is directed to providing a low-cost planter apparatus, that is, preferably formed of low cost, injection molded plastic components, and that provides a unique microclimate and very consistent and better growing conditions for plants planted indoors. The system is flexible enough that it can be used for planting African violets that do not like that much light or humidity to hibiscus or roses that need more light and more humidity. The preferred microclimate is created by using a soilless growing medium in a removable container with evaporation from the top of growing medium and a capillarity action that causes moisture to be wicked up from an underlying, wet chamber and air and oxygen to be also pulled up through the soilless medium. The preferred apparatus also includes at least one underlying dry chamber that provides an area for roots to develop that specialize in oxygen uptake, and at least one wet chamber that provides an area for roots to develop that specialize in nutrient and water uptake. Preferably, the roots are divided with some roots being exposed to large quantities of air and the other roots being partially immersed in water and nutrients. The plant roots have most of the soil removed from them before planting in the soilless medium. The soil remaining on the plant roots contains microorganisms that will inoculate the soilless medium and will multiple and grow. The plant roots and microorganisms biodegrade air polluting chemicals present, particularly gases.

BRIEF DESCRIPTION OF THE DRAWINGS

In the drawings, wherein like elements are referenced alike:

FIG. 1 is a perspective view of an indoor plant growing apparatus illustrating features according to the present invention;

FIG. 5 is a plan view of the receptacle and base;

FIG. 6 is a vertical cross sectional view of the plant receptacle; and

FIG. 7 is an enlarged, fragmentary view of a mesh bottom wall of the receptacle.

DETAILED DESCRIPTION OF THE PREFERRED EMBODIMENT

Figure 2:
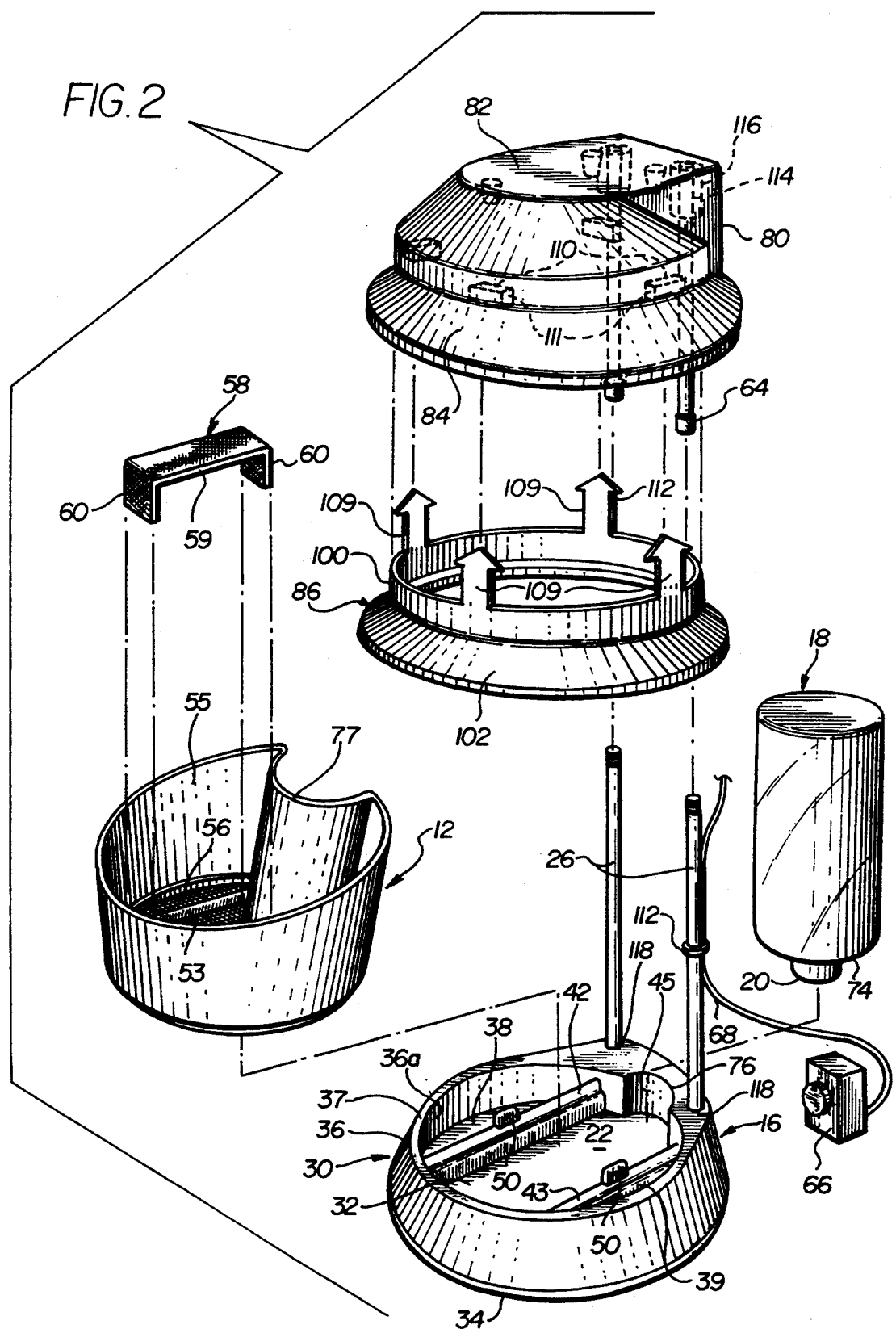
FIG. 2 is an exploded perspective view thereof.
Figure 3:
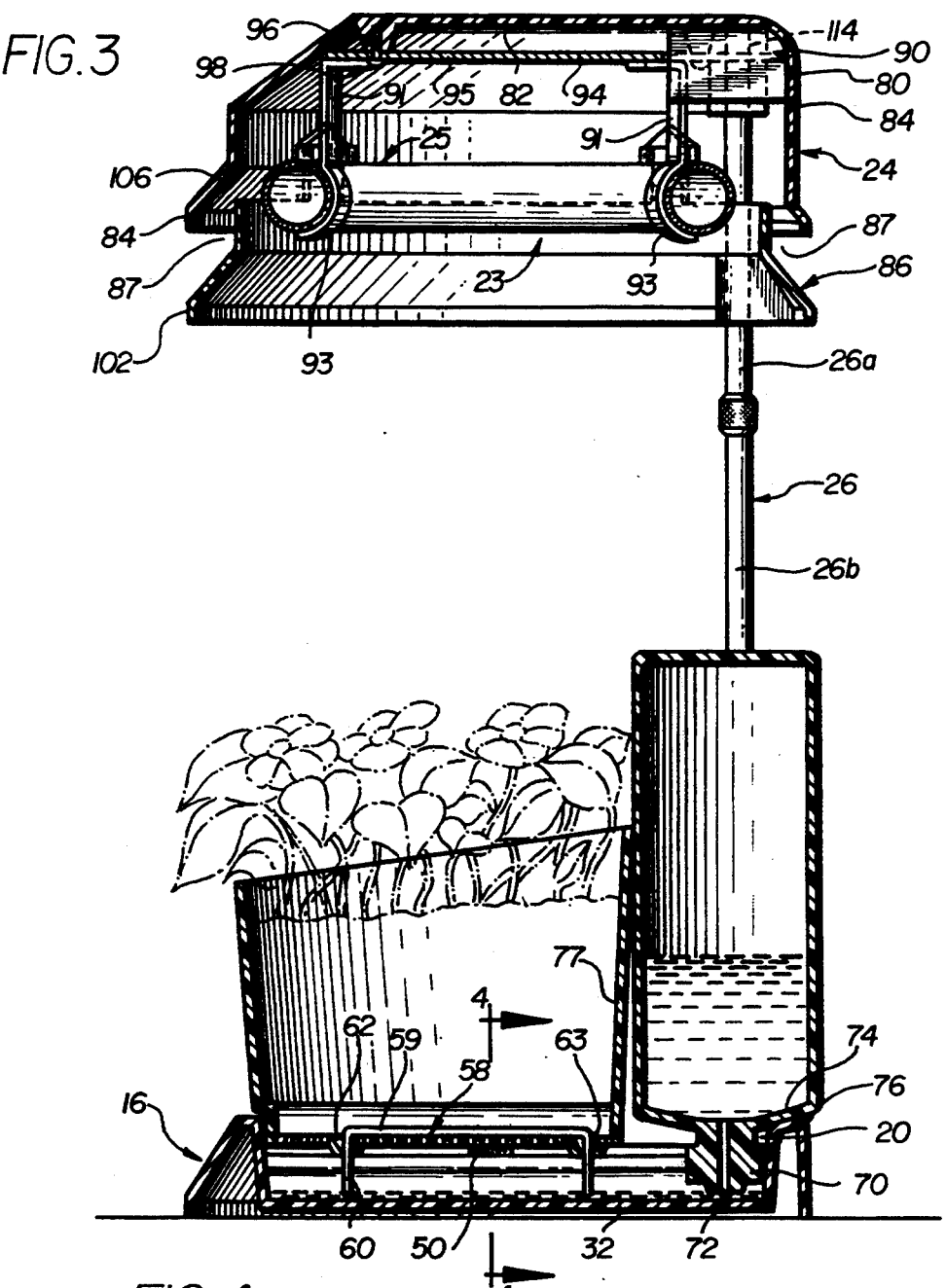
FIG. 3 is a vertical, cross-sectional view thereof taken along the line 3—3 of FIG. 1.
Figure 4:
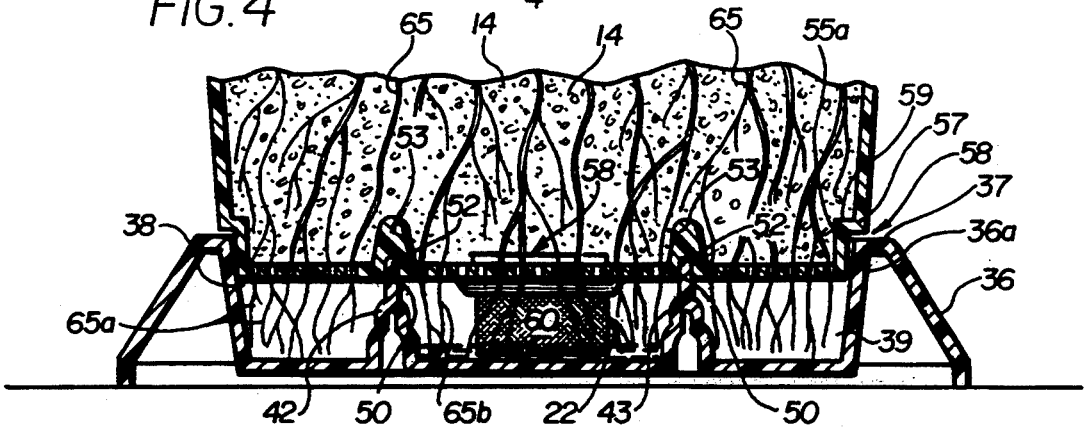
FIG. 4 is a cross-sectional view taken along the line 4—4 of FIG. 3.

Referring now to the drawings, in particular to FIG. 1, there is illustrated a plant growing apparatus 10 that comprises a separable growing receptacle or chamber 12 (FIG. 2) into which is placed the growing medium 14, and a plant (FIGS. 3 and 4). The growing chamber 12 is supported in a base 16 that is adapted to be seated on a desk or table. The watering system includes a nutrient reserve bottle 18 that is semi-automatic in dispensing water and nutrients from its lower end 20 into an underlying wet chamber 22. Light for the plant is provided by a lighting source 23 preferably in the form of a fluorescent bulb 25 (FIG. 3) carried within an upper hood 24 that is carried on the upper ends of adjustable support rods 26.

The preferred apparatus 10 is constructed with low cost molded parts of plastic to make an economical plant growing apparatus that can be produced and sold at a price that is (a) reasonable for a gift or purchase by a vast number of consumers, for offices or households. To provide such a construction, the hood 24, growing receptacle 12 and base 16 are constructed of injection molded plastic components that are readily assembled with the support rods 26 and the lighting assembly 23. Because the components are injection molded, thicker cross-sectional bosses or the like may be molded integrally; whereas, thermoform components do not have thicker bosses, etc. To this end, the molded base comprises a one-piece integrally molded body 30 (FIG. 2) has a flat bottom wall 32 with an encircling rim 34 that will rest on a table or desk. A vertical sidewall 36 projects upwardly from the bottom wall and is inclined inwardly as well as upwardly from the bottom rim 34 to define an interior hollow space which includes the central wet chamber 22 which is separated from a pair of dry chambers 38 and 39. These dry chambers are separated from the wet chamber by a pair of elongated ribs 42 and 43 that are integrally molded into the bottom wall 32 of the base 16.

To feed water and nutrients to the wet chamber 22, the rearward portion of the encircling sidewall of the base 16 has an arcuate recess 45 into which is seated the lower dispensing end 20 of the bottle 18. The water leaving the bottle flows into the wet chamber 22 and its level is adjusted by trimming the dispensing end 20 to a height so that it will be covered by water to prevent outflow of water from the bottle so that the water does not overflow over the top of the ribs 42 and 43 and flow into the dry chambers 38 and 39. A vacuum is created in the top of the bottle, and this vacuum also aids in metering water flow from the bottle. When the water in the wet chamber falls below the tip of the bottle, air flows into the bottle and bubbles up to the vacuum to partially relieve some of the vacuum with more water flowing from the bottle tip into the wet chamber to again raise the water level to cover the tip and thereby stop water flow from the bottles. To provide stability to the growing receptacle 12 against movement or tipping from the base 16, it is preferred to have a snap-fit or locating pins and sockets formed between the receptacle and base. To this end, small protrusions 50 are formed on the respective ribs 38 and 39 of the base; and they mate with recesses 52 (FIG. 5) of a similar size formed in a pair of ribs 53 in the bottom of the receptacle. Herein, the receptacle is aligned and given a slight downward push to insert the projections into the recesses which have a tight frictional fit with one another. A gentle upward pull will pull the protrusions from the recesses when removing the receptacle from the base.

The receptacle 12 holds a soilless, growing medium within its generally annular, upright sidewall 55 and a lower bottom wall that is preferably made of mesh 56 having a rectangular array of small openings through 57 (FIG. 7) which air may pass upwardly into the growing medium from the two lower dry chambers 38 and 39. The mesh is preferably integrally molded with the annular sidewall to form a one-piece molded plastic, growing receptacle 12.

With the injection molded receptacle 12 and the injection molded base having the thick cross-sectional protrusions 50 and thick walled recesses 52, and the seating of the receptacle bottom wall on the base ribs 42 and 43, the receptacle is stable. In this construction, a bottom corner 57 of the receptacle is spaced by a generally, annular air gap 58 from an upper edge 37 of the base sidewall 36. This annular air gap provides an annular space about the bottom receptacle through which air may flow into the dry chambers 38 and 39 and into the wet chamber 22. Thus, air will be supplied to entire bottom mesh wall 56 and to the soilless medium resting thereon. Herein, the bottom of the receptacle has a radially, inset annular ledge 59 (FIG. 4) which is spaced above the top edge 37 of the base to define the upper portion of the air gap. A depending annular section 55a of the lower end of the receptacle sidewall 55 is spaced radially from an encircling adjacent inner wall section 36a of the base to form the lower portion of the air gap.

Water from the wet chamber 22 in the base 16 is wicked upwardly into the receptacle by a wick 58 (FIGS. 2 and 3) that is formed of felt or other suitable wicking material. The preferred wick is of a soft bendable material in a strip 59 (FIG. 2) with opposite ends 60 that are bent down at right angles to a central portion of the wick that rests on the bottom wall mesh 56 of the receptacle. The ends of the wick are inserted through downwardly tapered slots 62 and 63 which are funnel-shaped to facilitate insertion of a wick end through the slot. The lower ends of the wick extend down into the water in the wet chamber 22 of the base 16.

Because the base is injection molded, the ribs 53 may have an increased cross-sectional thickness to provide strength and rigidity to the mesh bottom wall 56. The mesh is integrally molded with the ribs, and is supported thereby.

The soilless medium 14 and plant roots 65b (FIG. 4) in the central strip portion of the receptacle 12 over the wet chamber 32 are exposed to water from the wick 58 and the water in the wet chamber below the receptacle's bottom mesh portion 56 that is located over the wet chamber 22. Simultaneously on either side of the wet chambers 22, plant roots 65a hanging down from the growing medium 14 are exposed to air. Also, air is free to travel upwardly through that portion of the bottom mesh 56 overlying the two dry chambers 38 and 39 into the growing medium. The preferred growing medium is a soilless mixture of spaghnum moss, pearlite and vermiculite that has a capillarity action to pull moisture, air and nutrients upwardly to the top of the growing medium in the top of the receptacle. The upper surface of the growing medium is exposed to the ambient air and is being heated slightly by the overhead bulb 25. As best seen in FIG. 4, the plant roots 65 split and divide over the ribs 42 and 43 in the base 16 with the dry roots 65a being in the respective chambers 38 and 39, and the wet roots 65b being in the wet chamber 22. The oxygen roots provide oxygen to the plant, and the nutrient roots provide moisture to the plant. The wick 58 also by capillarity action pulls moisture to the upper side of the wall mesh 56 and delivers water to the roots contacting the wick and also delivers water to the soilless medium in contact with the wick. The evaporation of moisture from the top of the growing medium 14, the heat of the lamp and the nature of the growing medium cause air and moisture to rise through the growing medium and to be exhausted into the room. The microorganisms in the growing medium remove gases from the air and other particulates in the air, thereby providing a cleaner air discharge into the room. The plants also expire moisture into the room. The spaghnum moss is not the usual spaghnum peat moss which is harvested from dead products dug from the earth, but is the top part of live moss plants that grow in rich marshlands. The combination of spaghnum moss, pearlite and vermiculite provides a very light, porous, airy growing structure for the plant. The heat, light and evaporation of moisture around the plant provide superior growing conditions for the plant.

The preferred and illustrated bottle 18 provides enough moisture for one week for most plants. Nutrients are added to the water in the bottle. Preferably, a light timer 66 is connected to an electrical cord 68 for the light assembly, and it is set to control the duration and the time at which the bulb 25 is lighted. The timer is set for eight to ten hours for African violets; since too much light may burn the African violet leaves. Roses, on the other hand, are given about sixteen to eighteen hours of light per day to cause blooming. The preferred bulb is a Vita light which provides a light spectrum more closely duplicating sunlight including ultraviolet rays. However, regular fluorescent lights may be used for some plants.

The constant and self-metering of water into the wet chamber 22 is from the plastic bottle or container 18 that is disposed upside down with a lower outlet neck portion 70 having a discharge opening 72 that is adjusted vertical by cutting the lower neck portion 70 to the desired height for the water level relative to the bottom wall 32 of the base 16. The preferred bottle is a plastic bottle having a shoulder 74 which rests on a ledge 76 formed at the rear of the base (FIGS. 2 and 3). When installed with the shoulder resting on the ledge, water flows through the opening 72 (FIG. 3) until sufficient water covers the opening 72; and a suitable vacuum is formed with the top closed end of the bottle where water was formerly present. The vacuum within the bottle and the air pressure acting on the pool of water in wet chamber cooperate to limit the outflow of water from the bottle, thus providing an automatic metering of liquid from the bottle to the wet chamber 22. The liquid level is such that it does not overflow the base and is sufficient to contact the wick ends 60 until the bottle empties, usually after one week.

The bottle 18 can be inserted, beginning with a simple rearward tilt to the vertical with the lower open end 20 of the bottle inserted into the recess 45 and then the bottle is swung upright to the vertical with a bottle shoulder 74 resting on the ledge 76 at the top of the depression 53 in the base 16a. A trough-like vertical groove 75 (FIG. 5) in the receptacle 12 receives and cradles a portion of the upper end of the bottle and keeps the bottle protected and generally within the confines of the base 16 so as to provide a small area profile for the planting apparatus 10.

Preferably, the trough-like, vertical groove 77 in the receptacle has a slightly downward taper relative to the true vertical. When in the groove 77, the bottle is also protected from being hit by the two support rods 26 on opposite sides of the bottle 18.

The light assembly 23 is mounted in the upper hood 24 which comprises an upper plastic housing 80 having a hollow interior space enclosed within a top wall 82 and an integral, annular inclined sidewall that serves as a light shade 84 and a protector for the light assembly. The preferred hood includes a second lower inclined, annular sidewall that serves as a light shade 86 spaced from the upper shade, and light is allowed to shine into a space 87 (FIG. 3) between the spaced shades 84 and 86 to provide a light halo effect in the space 87 between the two shades. The hood housing 80 has a rearward internal cavity into which is secured an electrical ballast assembly 90 (FIG. 3). The electrical ballast and other components for the fluorescent light bulb 25 are mounted in a sealed electrical ballast assembly 90 that is impervious to moisture from the plant. The injection molded cavity may be sized to have a press fit with the ballast assembly housing to retain the same in position.

The illustrated lighting source 23 comprises a circular, fluorescent light bulb 25 which is supported by a number of hangers 91 having lower concave ends 93 into which is inserted the circular light bulb 25. The upper ends of the hangers are secured to a circular, metallic reflector disk 94 that has a silvered, reflective, underlying surface 95 for reflecting light from the top of the bulb back downwardly onto the top of the plant. The reflector disk 94 is suitably attached to the underside of the hood housing 80. For example, bosses 96 are molded into the underside of the hood to provide a thick portion into which may be threaded screws 98 which have screw heads beneath the reflector disk 94. Thus, the screws 98 will secure the lighting assembly to the underside of the hood 80.

The lower shade 86 need not be used but it is preferred for the aesthetics provided by the light halo effect and the double shade look. The lower shade is a separately molded, plastic body discrete from the upper shade housing 80, as best seen in FIG. 2, and may be attached thereto as by snap fitting the lower shade to the housing. As best seen in FIG. 2, the lower shade includes an annular, vertical band 100 with a lower, outwardly flared skirt or shade 102 which is spaced from the upper shade 84. Light may pass through the space between shades hit the underside of the skirt 84 (FIG. 3) of the hood and be reflected through the space 87 between the shade skirts 84 and 86. The vertical band 100 of the lower shade 84 may be attached in various ways to the upper shade 86. The illustrated attachment is made by having a series of snap fitted connections in the form of small spaced projections 109 (FIG. 2) that are in the form of arrow-shaped heads that are pushed upwardly through vertical slots 110 in bosses 111 the inside wall of the hood. When shoulders 114 on the arrow-shaped heads are pushed through the slots 110, they are compressed within the slot and then expand to rest on the top of the bosses 111 in the top hood.

The upper portions 26 of the support rods 26 are force fitted into vertical bores 114 (FIG. 2) molded into vertical, thick, plastic bosses 116 of plastic integrally molded into the top hood of the apparatus on either side of the ballast 90. The injection molded bosses 116 provide an inexpensive attachment for the hood to the support rods. Likewise, the lower ends of the lower vertical rod portions 26b are forced fitted into vertical bores 118 in the base 16 in thick, plastic bosses molded integrally into the base. The rods 26 are thus fastened to the upper and lower portions of the apparatus in a simple and inexpensive manner.

Herein, the support rods 26 for holding the shades 84 and 86 and the lighting assembly 23 above the plant comprise upper and lower telescoping portions 26a and 26b that are held at an adjusted telescoped length by twisting the knurled ring 64. The length of the rods may be adjusted as the plant grows in height. The electrical cord 68 may be connected to the rear side of one of rods 26 by a C-shaped, spring clip 112 (FIG. 2) to provide an inexpensive retainer to hold the electrical cord in position.

What is claimed is:

1. An indoor plant growing apparatus for growing plants having roots in a soilless medium comprising:
    an upper hood having a light assembly therein and having a light source for directing light downwardly to the plant;
    a base having a divider for dividing the base into a wet compartment for holding liquid and at least one dry compartment;
    a removable receptacle for holding the soilless medium and having a mesh bottom through which roots may grow into the wet chamber to obtain moisture and a dry compartment into which other roots are exposed to air;
    a vertical support extending from the base to the upper hood to support the hood at a predetermined height to position the light source above the plant to direct light down toward the plant to create a microclimate with the soilless medium and the liquid,
    a liquid reservoir for supplying liquid to the wet compartment and thereby to the soilless medium above the wet compartment and to the roots in the removable receptacle,
    and releasable means between the base and the receptacle to position the receptacle on the base and allowing detachment of the receptacle from the base to clean the plant and/or the soilless medium.

2. An indoor plant growing apparatus in accordance with claim 1 wherein the vertical support comprises a pair of vertical rods which are telescoped to adjust the height of the light source, the upper hood is an injection molded plastic hood having thin walls and thicker, integral, plastic bosses, and bores are formed in the bosses in the hood and base to receive respectively upper and lower levels of the vertical rods to secure the rods, base and hood together.

3. An indoor plant growing apparatus in accordance with claim 1 wherein a wick is supported on the mesh bottom of the receptacle, openings are formed in the bottom of the receptacle, and portions of the wick project through the openings into the underlying wet chamber to allow wicking of liquid from the wet chamber to the soilless medium.

4. An indoor plant growing apparatus in accordance with claim 1 wherein the upper hood comprises an upper shade portion and a top cover portion integrally molded together of plastic to receive and support the light assembly therein and wherein a second lower shade in the form of a band is detachably connected to the upper shade.

5. An indoor plant growing apparatus in accordance with claim 4 wherein the lower shade includes an annular rim having snap fit connections for snap fitting with the upper shade and hood portion, and wherein light slits are formed in the annular rim to allow light to pass between the upper and lower shades to produce a light halo thereabout.

6. An indoor plant growing apparatus in accordance with claim 1 wherein the liquid reservoir comprises an inverted bottle having a neck projecting down into the wet chamber.

7. An indoor plant growing apparatus in accordance with claim 1 wherein the upper hood supports a light assembly which comprises a reflector secured to the inside surface of the upper cover portion of the hood, the light source comprising a single circular fluorescent bulb supported inside of the upper cover portion, and a ballast and electrical assembly for the fluorescent bulb fitted into the upper cover portion at the vertical support.

8. An indoor plant growing apparatus in accordance with claim 1 in which the mesh bottom of the receptacle is a screen-like mesh with openings between crossing plastic webs to allow air and moisture to flow upwardly through the openings and to allow roots to grow downwardly through the openings into the underlying wet and dry chambers.

9. An indoor plant growing apparatus in accordance with claim 1 wherein the releasable means between the base and the receptacle comprise interfitting portions that frictionally grip one another when pressed together to secure the receptacle against being inadvertently detached from the base.

10. An indoor plant growing apparatus in accordance with claim 9 wherein the interfitting portions comprise sockets in ribs in the base and projections projecting downwardly from the mesh bottom of the receptacle and force fitted into the sockets.

11. A low cost plant growing apparatus for growing plants indoors in a soilless medium, said apparatus comprising:
    an upper hood of a molded piece of plastic having an upper cover portion and integral, outwardly flaring portion forming a first shade;
    a lighting assembly secured to an inside surface of the upper cover portion of the upper hood including a reflector for reflecting light downwardly;
    a ballast and electrical assembly affixed to an inside surface of the upper hood and covered thereby, a second shade of molded plastic detachably connected to the upper hood and spaced therefrom and located below the reflector and spaced from the first shade to provide a light halo;
    a base having dividers therein dividing the base into a control wet chamber and dry chambers on opposite sides of the wet chamber for receiving plant roots and directing air to the roots at the bottom of a plant in a soilless medium;
    the upper hood and the base having bosses integrally molded therein to provide a thick cross-section of plastic and having bores in the bosses;
    a pair of substantially straight rods force fitted into the bores in the base and bores in the hood to support the hood and light assembly therein;
    a removable receptacle for holding a soilless medium;
    an integral molded mesh bottom wall in the bottom of the receptacle to form a support for the soilless medium with air and liquid passing through the mesh bottom wall to the soilless medium to allow gases and other pollutants to be removed from the air passing upwardly past microbes and roots in the soilless medium;
    an inverted liquid container supported on the base and metering the delivery of liquid therein into the wet chamber, a discharge opening in the container being below the liquid level in the wet chamber when the container is substantially full of liquid; and
    a wick disposed between the wet chamber and the soilless medium in the receptacle to wick liquid from the wet chamber to the roots above the mesh bottom of the receptacle.

* * * * *